| United States Patent [19] | [11] | 4,357,402 |
|---|---|---|
| Sheibley et al. | [45] | Nov. 2, 1982 |

[54] POLYVINYL ALCOHOL CROSS-LINKED WITH TWO ALDEHYDES

[75] Inventors: Dean W. Sheibley, Sandusky; Lorra L. Rieker, Cleveland; Li-Chen Hsu, Westlake; Michelle A. Manzo, Cleveland, all of Ohio

[73] Assignee: The United States of America as represented by the Administrator of the National Aeronautics and Space Administration, Washington, D.C.

[21] Appl. No.: 272,234

[22] Filed: Jun. 10, 1981

[51] Int. Cl.$^3$ .................. C08F 8/28; H01M 2/00; H01M 2/16; H01M 2/18
[52] U.S. Cl. .................. 429/206; 264/104; 429/253; 525/61
[58] Field of Search .................. 525/61; 264/104; 260/17.4 UC; 429/27, 28, 139, 249, 253, 206

[56]  References Cited
U.S. PATENT DOCUMENTS
4,272,470  6/1981  Hsu et al. .................. 525/61

Primary Examiner—Stanford M. Levin
Attorney, Agent, or Firm—Normal Musial; John R. Manning; James Mackin

[57] ABSTRACT

A film-forming polyvinyl alcohol resin is admixed, in aqueous solution, with a dialdehyde cross-linking agent which is capable of cross-linking the polyvinyl alcohol resin and a water soluble acid aldehyde containing a reactive aldehyde group capable of reacting with hydroxyl groups in the polyvinyl alcohol resin and an ionizable acid hydrogen atom. The dialdehyde is present in an amount sufficient to react with from 1 to 20% by weight of the theoretical amount required to react with all of the hydroxyl groups of the polyvinyl alcohol. The amount of acid aldehyde is from 1 to 50% by weight, same basis, and is sufficient to reduce the pH of the aqueous admixture to 5 or less. The admixture is then formed into a desired physical shape, such as by casting a sheet or film, and the shaped material is then heated to simultaneously dry and cross-link the article.

14 Claims, 1 Drawing Figure

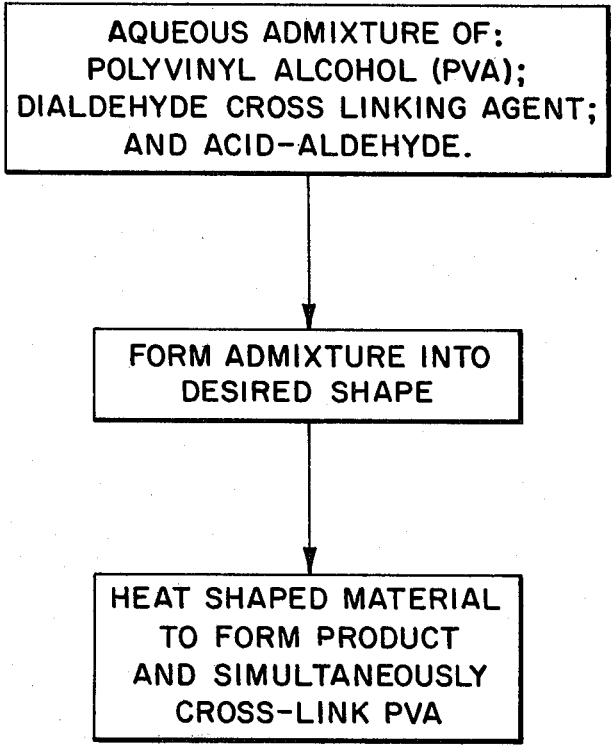

POLYVINYL ALCOHOL CROSS-LINKED WITH TWO ALDEHYDES

ORIGIN OF THE INVENTION

The invention described herein was made by employees of the U.S. Government and may be manufactured and used by or for the Government for governmental purposes without the payment of any royalties thereon or therefor.

FIELD OF THE INVENTION

The present invention relates to a polyvinyl alcohol structure and a method for producing such a structure and, more specifically, to a "one step" method of fabricating cross-linked polyvinyl alcohol articles which are particularly useful in producing battery separators.

BACKGROUND OF THE INVENTION

Earlier processes for preparation of cross-linked polyvinyl alcohol (PVA) sheets and films have involved a two-step method in which a dry film was first made and later cross-linked. Typical processes included treatment of a dry PVA film with an aldehyde-containing cross-linking solution or treatment with an acid solution of a dry PVA film in which an aldehyde cross linking agent was incorporated. Thus, these earlier processes require two distinct steps: (1) making of the PVA sheet or film; and (2) treatment with a solution to effect cross-linking. Rinsing and drying were also required after the cross-linking step.

It is an object of the present invntion to provide a novel method of producing cross-linked polyvinyl alcohol articles. It is a further object to provide such a process in which cross linking of the article is effected simultaneously with the formation of the article, thus avoiding the need of a separate cross linking step. It is a further object to provide cross-linked polyvinyl alcohol articles such as battery separators, made by the process.

BRIEF SUMMARY OF THE INVENTION

The foregoing and other objects which will be apparent to those having ordinary skill in the art are achieved in accordance with the present invention by providng a method of producing a cross-linked polyvinyl alcohol element which comprises the steps of: providing an aqueous admixture comprising a film-forming polyvinyl alcohol resin, a dialdehyde cross-linking agent capable of cross-linking the polyvinyl alcohol resin, said cross-linking agent being present in an amount of from 1 to 20% by weight of the theoretical amount required to react with all of the hydroxyl groups of the polyvinyl alcohol resin, and a water soluble acid-aldehyde containing a reactive aldehyde group capable of reaction with hydroxyl groups in the polyvinyl alcohol resin and an ionizable acid hydrogen atom, said acid aldehyde being present in an amount of from 1 to 50% by weight of the theoretical amount required to react with all of the hydroxyl groups of the polyvinyl alcohol resin and sufficient to reduce the pH of the aqueous admixture to not more than 5; forming the admixture into a desired physical shape; and heating the shaped admixture to form a shelf-supporting polymeric article and to simultaneously effect a cross linking reaction between the dialdehyde cross linking agent and the polyvinyl alcohol resin to produce a cross-linked polyvinyl alcohol element.

Other features and advantages of the invention will be apparent from the description of preferred embodiments which follows, including the drawing which is a block flow diagram of the method of the invention.

DESCRIPTION OF PREFERRED EMBODIMENTS

The polyvinyl alcohol resin useful in the invention is a conventional, film-forming, polymeric material readily available commercially and can be of the type used heretofore for making separators for alkaline batteries. Commercially available polyvinyl alcohol normally contains about 0.5 to 6% of 1,2-diol units in the predominantly 1,3-diol structure. The presence of 1,2-diol units in the chain results in reduced resistance to oxidation. Accordingly, it is preferred, in the practice of the present invention, to use a polyvinyl alcohol substantially free (i.e. containing less than about 5) of 1,2-diol units. Polyvinyl alcohol having an essentially head-to-tail structure of this type is readily available. It is made by the alcoholysis of polyvinyl acetate having an essentially head-to-tail structure which is made by low temperature polymerization of vinyl acetate. The polyvinyl alcohol is a film-forming resin having, generally, a number average molecular weight of 10,000–200,000 and is conveniently provided and used in aqueous solution such as 10–20% resin by weight. The amount of PVA used in the present process is generally from 3 to 20% by weight, based on the total amount of PVA and water in the aqueous admixture. Preferably, the amount of PVA is from 5–15%, same basis.

The cross-linking agent is a dialdehyde. Suitable dialdehydes include glyoxal and other dialdehydes which may be represent by the formula

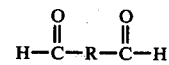

wherein R is a divalent organic radical such as an aliphatic, cycloaliphatic, aromatic, or heterocyclic radical. Preferred dialdehydes include glutaraldehyde and other aliphatic dialdehydes wherein R is a divalent aliphatic hydrocarbon radical having from 1 to 12 carbon atoms, preferably 1 to 6 carbon atoms, and furan aldehydes, e.g. furan dialdehyde, represented by the formula:

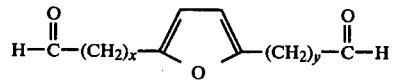

wherein x and y are each 0–2. Other dialdehydes, however, may be used, for example, the polyaldehydepolysaccharide compounds, such as dialdehyde starch, disclosed in application Ser. No. 145,271, filed Apr. 30, 1980, now U.S. Pat. No. 4,272,470, issued June 9, 1981, the disclosure of which is herein incorporated by reference. In general, the dialdehyde is one which forms a homogeneous admixture with the polyvinyl alcohol polymer.

The dialdehyde cross-linking agent is preferably provided as an aqueous solution or dispersion for ease of mixing with the polyvinyl alcohol which is also preferably provided in aqueous solution. In any event, the polymer and cross-linking agent are admixed, preferably in aqueous solution. The cross-linking agent is used in an amount of 1 to 20% by weight of the theoretical amount required to cross-link all of the available hydroxyl groups of the polymer.

The acid aldehyde used must satisfy four requirements. First, it must have a reactive aldehyde group capable of reacting with the hydroxyl groups of the PVA. It is preferred that the aldehyde group reacts with hydroxyl groups in a single polymer chain rather than with hydroxyl groups in two different polymer chains. In the present aqueous system in which the PVA is present in not more than about 20% concentration, it is found that the majority of the aldehyde groups of the acid-aldehyde reagent react in this manner. The acid-aldehyde agent is thus incorporated into the polymer structure. Second, the acid group must contain an ionizable hydrogen. Third, the agent must be sufficiently acidic to provide a pH of not more than 5, preferably 4–5, when used in an amount of 1–50%, preferably 1–20%, by weight of theoretical amount that will react with all of the hydroxyl groups of the PVA. Fourth, the agent must be water soluble.

Several different acids are suitable including carboxylic, sulfuric and phosphoric. Glyoxylic acid is preferred because it is readily available commercially. Preferred acid-aldehydes are those having the formulas

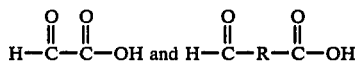

and the sulfonic and phosphonic acid analogs thereof, wherein R is a divalent organic residue. The divalent organic residue may be aromatic, aliphatic or cycloaliphatic and may be substituted with non-interfering substituents provided that the four basic requirements set forth above are met. Preferred divalent organic radicals include phenylene and alkyl of 1 to 6 carbon atoms. The acid-aldehyde serves several functions. It functions as an acetalization reagent. Since it has an aldehyde functional group, it reacts with 1,3-diol units in the PVA. It functions as an acid "catalyst" to induce the cross-linking action between the PVA and the dialdehyde and the reaction between itself and the PVA. The reagent is incorporated chemically into the PVA structure: it is not present as a soluble or insoluble residue in the film.

EXAMPLE 1

A solution mixture for casting or dipping is made from the following formulation:

| Ingredient | Parts by weight |
| --- | --- |
| Medium viscosity PVA (10% aqueous solution) | 250 |
| Dialdehyde of Furan (DAF) | 0.5 |
| Water | 45 |
| Wetting Agent (4 grams Triton X-100/ 500 ml water) | 0.5 |
| Glyoxylic Acid (50% solution in water) | 4.2 |

All ingredients, except the GOA, are mixed in a blender. When blended, the GOA is added and the blending is continued for five minutes more. Then the mixture is heated in a boiling water bath. After ½ hour of heating, (temperature of the solution about 120°–125° F.) if the solution is to be used to dip electrodes, the electrodes are dipped into the solution, withdrawn, and dried in an oven at 90° C. until dry (about ¼ hour). If the solution is to be cast to make a film, the total elapsed time from addition of the GOA plus heating at 120°–125° F. should not exceed about 45 minutes. The film is cast at about 50 mils wet thickness onto a glass or stainless steel plate. The plate is then placed in an oven at 90° C. until dry (about ¼ hour). The 50 mils wet film wil yield about 2 to 3 mils dry. If heating is continued beyond 45 minutes at 120°–125° F., globs of gel begin to form in the solution indicating that cross-linking has started.

To determine if the dried film is cross-linked, the dried film is placed directly into boiling water (neutral pH). After 20 minutes the film will be recovered intact if it is cross-linked. In the present example, the film is cross-linked and a battery separator having good electrical and physical properties is obtained.

As indicated in Example 1, the ingredients are preferably blended before adding the acid aldehyde. Prior to adding the acid aldehyde, the aqueous admixture may be heated to facilitate blending, particularly the intimate admixture of the dialdehyde and the PVA. It is preferred, however, to keep the temperature low, particularly when the acid-aldehyde is added, to prevent premature cross-linking. Accordingly, it is preferred to heat the admixture to not more than about 150° F. and that the temperature of the admixture is not more than about 135° F. when the acid-aldehyde is added.

After addition of the acid-aldehyde, the admixture may be gently heated to facilitate its admixture. However, temperature should be sufficiently low to prevent any substantial cross-linking and, in general, it is preferred to maintain the temperature at not higher than about 135° F.

Once the admixture is blended, it is preferred to form it into desired final shape quickly, in order that substantially all of the cross-linking occurs after shaping. The permissible time will, of course, depend on the temperature and to some extent on the formulation.

Drying of the shaped article can be effected at any temperature suitable to effect drying and cross-linking. However, the temperature of the article should not be so high as to dehydrate the PVA. A preferable maximum drying temperature is about 205° F. The minimum drying temperature is selected to effect drying and cross-linking in a desired amount of time. In general, a minimum drying temperature of about 150° F. is preferred.

COMPARISON EXAMPLE 1

The resistivity of a cast film made in accordance with the one step method of the present invention is compared with a film made in a two step method in which cross-linking is effected by post-treatment of the dry film with acid. In each film, 2% dialdehyde of furan is incorporated into the film. Results are as follows:

| Experiment | Method | Glyoxylic acid in film (Wt. %) | Resistivity (ohm-cm²) |
| --- | --- | --- | --- |
| A | Two Step | 0 | .14 |
| B | Two Step | 20 | .20 |
| C | One Step | 10 | .10 |

The comparison with Experiment A illustrates the good electrical properties of the product of the present invention compared with a conventional two-step cross-linking method. The comparison with Experiment B illustrates the importance of incorporating the acid-aldehyde into the PVA before forming the film.

EXAMPLE 2

The procedure of Example 1 is followed except that the dialdehyde of furan is replaced by a dialdehyde of starch. Results are substantially the same as in Example 1.

EXAMPLE 3

A separator film incorporating a filler is made in accordance with the present invention from the following aqueous admixture:

| Ingredient | Parts by weight |
| --- | --- |
| Medium viscosity PVA (10% solution) | 250 |
| DAF | 0.5 |
| Water | 50 |
| Wetting Agent (as in Example 1) | 0.5 |
| 200 mesh white pine wood flour | .69 |
| Titanium dioxide (Degussa P-25) | .56 |
| Tamol 731 (filler dispersing agent), 25% water solution | .2 |
| Glyoxylic acid | 4.2 |

Following the procedure of Example 1, a cross-linked PVA battery separator having good electrical and physical properties is obtained.

EXAMPLE 4

Example 3 is followed except that the fillers wood flour and titania are replaced by:

| Ingredient | Parts by Weight |
| --- | --- |
| Calcium Zirconate Silicate (CZS, TAM Products, NL industries) | 1.09 |
| Titanium Dioxide (Degussa p-25) | .19 |

The procedure of Example 1 is followed, and results are substantially the same as in Example 4.

COMPARISON EXAMPLE 2

The resistivity of a cast film, containing 5% filler, and made in accordance with the present invention is compared with a film made with a two step cross-linking method, using after-treatment with acid to effect cross-linking. Results are as follows:

| Experiment | Filler Composition | Ratio | Resistivity (Ohm-Cm$^2$) Two Step | Resistivity (Ohm-Cm$^2$) One Step |
| --- | --- | --- | --- | --- |
| D | 200 mesh wood flour: Titania | 5:4 | .31 | .15 |
| E | calcium zirconate silicate: titania | 5:1 | .43 | .12 |

As illustrated in the Examples, the admixture may include conventional addenda such as fillers, wetting agents, and the like. Fillers, for example, may be incorporated in an amount of 5–20% by weight, based on the weight of the PVA. Suitable fillers include titania, titanates, silicates, zirconates, aluminates, wood flour, and lignin. It is important to note that the admixture may be free of any conventional acid catalyst. This is important because a conventional acid catalyst, such as sulfuric acid, may cause blackening and increased resistance when the cross-linked PVA article is subjected to operating temperatures of 160°–180° F.

The present one step method of cross-linking a cast film while drying is compatible with present PVA commercial film casting techniques. A suitable release agent in small quantity (0.1%–1.0% by weight) may be used to obtain release of the dry cross-linked film from the casting belt. The separator solution may be applied to woven or non-woven substrates such as polypropylene, asbestos, nylon, cellulose base, or polyvinyl alcohol in one or more coats using conventional paper coating techniques.

What is claimed is:

1. A method of producing a cross-linked polyvinyl alcohol element which comprises the steps of:
   providing an aqueous admixture comprising
     a film-forming polyvinyl alcohol resin,
     a dialdehyde cross-linking agent capable of cross-linking the polyvinyl alcohol resin, said cross-linking agent being present in an amount of from 1 to 20% by weight of the theoretical amount required to react with all of the hydroxyl groups of the polyvinyl alcohol resin, and
     a water soluble acid-aldehyde containing a reactive aldehyde group capable of reacting with hydroxyl groups in the polyvinl alcohol resin and containing an ionizable acid hydrogen atom, said acid-aldehyde being present in an amount of from 1 to 50% by weight of the theoretical amount required to react with all of the hydroxyl groups of the polyvinyl alcohol resin and sufficient to reduce the pH of the aqueous admixture to not more than 5;
   forming the admixture into a desired physical shape; and
   heating the shaped admixture to form a self-supporting polymeric article and to simultaneously effect a cross-linking reaction between the dialdehyde cross-linking agent and the polyvinyl alcohol resin to produce a cross-linked polyvinyl alcohol element.

2. A method according to claim 1 wherein the admixture is formed into a desired physical shape by casting a film of said admixture onto a support.

3. A method according to claim 1 wherein the admixture is formed into a desired physical shape by immersing a support into said admixture and removing the support therefrom, whereby a coating of said admixture is provided on the support.

4. A method according to claim 1 wherein said acid aldehyde is selected from the group consisting of those having the formulas

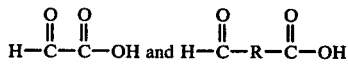

and the sulfonic and phosphonic acid analogs thereof wherein R is a divalent organic radical.

5. A method according to claim 4 wherein R is selected from the group consisting of a divalent aliphatic radical, a divalent cycloaliphatic radical and a divalent aromatic radical.

6. A method according to claim 5 wherein R is a divalent alkyl radical of from 1 to 6 carbon atoms.

7. A method according to claim 5 wherein R is phenylene.

8. A method according to claim 1 wherein said acidic aldehyde comprises glyoxylic acid.

9. A method according to claim 1 wherein said polyvinyl alcohol resin is present in said admixture in an amount of from 3 to 20% by weight, based on the total weight of water and polyvinyl alcohol resin in said admixture.

10. A method according to claim 1 wherein said dialdehyde is selected from the group consisting of ethane dial and dialdehydes having the formula

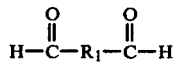

wherein $R_1$ is a divalent organic radical of from 1 to 12 carbon atoms.

11. A method according to claim 1 wherein said dialdehyde comprises a dialdehyde starch.

12. Cross-linked polyvinyl alcohol made by the process of claim 1.

13. In an alkaline battery having a cross-linked polyvinyl alcohol separator, the improvement wherein the separator is made by the process of claim 1.

14. A method according to claim 1 wherein the amount of acid aldehyde is 1–20% by weight.

* * * * *